United States Patent [19]
Sugiyama

[11] Patent Number: 5,746,675
[45] Date of Patent: May 5, 1998

[54] CARRIER CONNECTING STRUCTURE FOR AN AUTOMATIC TRANSMISSION

[75] Inventor: Shinichi Sugiyama, Fuji, Japan

[73] Assignee: Jatco Corporation, Japan

[21] Appl. No.: 573,295

[22] Filed: Dec. 15, 1995

[30]  Foreign Application Priority Data

Dec. 28, 1994  [JP]  Japan .................... 6-337553

[51] Int. Cl.$^6$ ........................................ F16H 3/44
[52] U.S. Cl. .................... 475/278; 475/323; 475/331
[58] Field of Search .................... 475/275, 278, 475/338, 323, 324, 331

[56]  References Cited

U.S. PATENT DOCUMENTS

| | | | |
|---|---|---|---|
| 2,800,036 | 7/1957 | Miller | 475/278 X |
| 5,139,468 | 8/1992 | Churchill et al. | 475/323 X |
| 5,328,419 | 7/1994 | Motl et al. | 475/323 X |

FOREIGN PATENT DOCUMENTS

| | | | |
|---|---|---|---|
| 2-125134 | 5/1990 | Japan | 475/278 |
| 2-296041 | 12/1990 | Japan | 475/278 |
| 5-202998 | 8/1993 | Japan | 475/278 |

*Primary Examiner*—Khoi Q. Ta
*Attorney, Agent, or Firm*—Rossi & Associates

[57]  ABSTRACT

In a carrier connecting structure for an automatic transmission having a brake 6 that brakes and releases a rotating member 6a by oil pressure and a planetary gear mechanism 5 having a carrier 5e supporting a planetary gear train 5d, a fixing section 5i having fixing surfaces 5g, 5h oriented in a perpendicular direction and a circumferential direction relative to a shaft line is provided on the outer circumference of this carrier 5e, a flange 6d having fixing surfaces 6b, 6c which come in contact with the fixing surfaces 5g, 5h projects from the rotating member 6a, and the fixing section 5i of the carrier 5e and the flange 6d of the rotating member 6a are fixed by a screw member 9. Thus, the automatic transmission carrier connecting mechanism is easy to assemble and highly reliable.

5 Claims, 3 Drawing Sheets

CARRIER CONNECTING STRUCTURE FOR AN AUTOMATIC TRANSMISSION

BACKGROUND OF THE INVENTION

1. Field of the Invention

This invention relates to a carrier connecting structure for an automatic transmission mounted on an automobile.

2. Description of the Prior Art

Some types of conventional automatic transmissions mounted on automobiles make use of planetary gear mechanisms. Japanese Patent Application Laid-open No. 61-133147 for example, discloses a planetary gear device for an automatic transmission In the prior art planetary gear device, a carrier (b) supporting a planetary gear train (a) and a hub (d) of a brake (c) are formed as separate members as shown in FIG. 3. A notch (e) and snap ring groove (f) are formed one the edge of the hub (d), and a projection (g) that engages with the notch (e) of the hub (d) is formed on the carrier (b). The hub (d) of the brake (c) is fixed relative to the carrier (b) by the engaging of a snap ring (h) with the snap ring groove (f) after this projection (g) has engaged with the notch (e).

However, forming the projection (g) on the carrier (b) and forming the notch (e) in the hub (d) as described in the prior art require a large number of machining steps. This makes parts more expensive, and as there are also a large number of assembly steps involved, the cost of the transmission increased.

Further, as the hub (d) is attached to the carrier (b) by means of the snap ring (g), the structure was weak. In addition, as there was a risk of the snap ring (g) falling off, the structure was not reliable, and the snap ring (g) could not be attached unless a backlash was provided in the axial direction between the carrier (b) and hub (d). It was therefore necessary to leave enough clearance from peripheral parts for the backlash. This increased the overall length of the transmission and made it larger.

SUMMARY OF THE INVENTION

To overcome the aforesaid problems in the prior art, it is an object of the present invention to provide a carrier connecting mechanism for an automatic transmission which is easy to assemble, uses low cost parts and is highly reliable.

According to this invention, in the carrier connecting structure for an automatic transmission comprising a brake that brakes and releases a rotating member by oil pressure and a planetary gear mechanism having a carrier supporting a planetary gear train, this carrier being connected to the rotating member, a fixing section having fixing surfaces oriented in a perpendicular direction and a circumferential direction relative to a shaft line is provided on the outer circumference of the carrier, a flange having fixing surfaces which come in contact with the aforesaid fixing surfaces projects from the rotating member, and the fixing section of the carrier and the flange of the rotating member are connected by connecting means.

Due to the aforesaid construction, the carrier and rotating member are easily and securely fixed by connecting means, and as there is no need to provide a backlash in an axial direction between them, the overall length in the axial direction can be reduced.

As the carrier is positioned relative to the rotating member by a circumferentially oriented fixing surface, centering of the carrier can be performed with high precision, and as the gear tooth contact of the planetary gear train supported by the carrier is uniform, durability is improved.

In the aforesaid carrier connecting structure for an automatic transmission, screw members are preferably used as the connecting means. The carrier connecting structure may rotate in only one direction due to power transmitting means that permits rotation in only one direction inserted between the rotating member and a transmission case.

The planetary gear mechanism may comprise a double row planetary gear train. Further, the position of the fixing section which attaches the flange of the rotating member is preferably located in a boss supporting a short pinion gear.

BRIEF DESCRIPTION OF THE DRAWINGS

The invention will be described in greater detail with reference to certain preferred embodiment thereof and the accompanying drawings, wherein.

DESCRIPTION OF THE PREFERRED EMBODIMENT

One embodiment of this invention will now be described in more detail with reference to the drawings.

Figure 1:
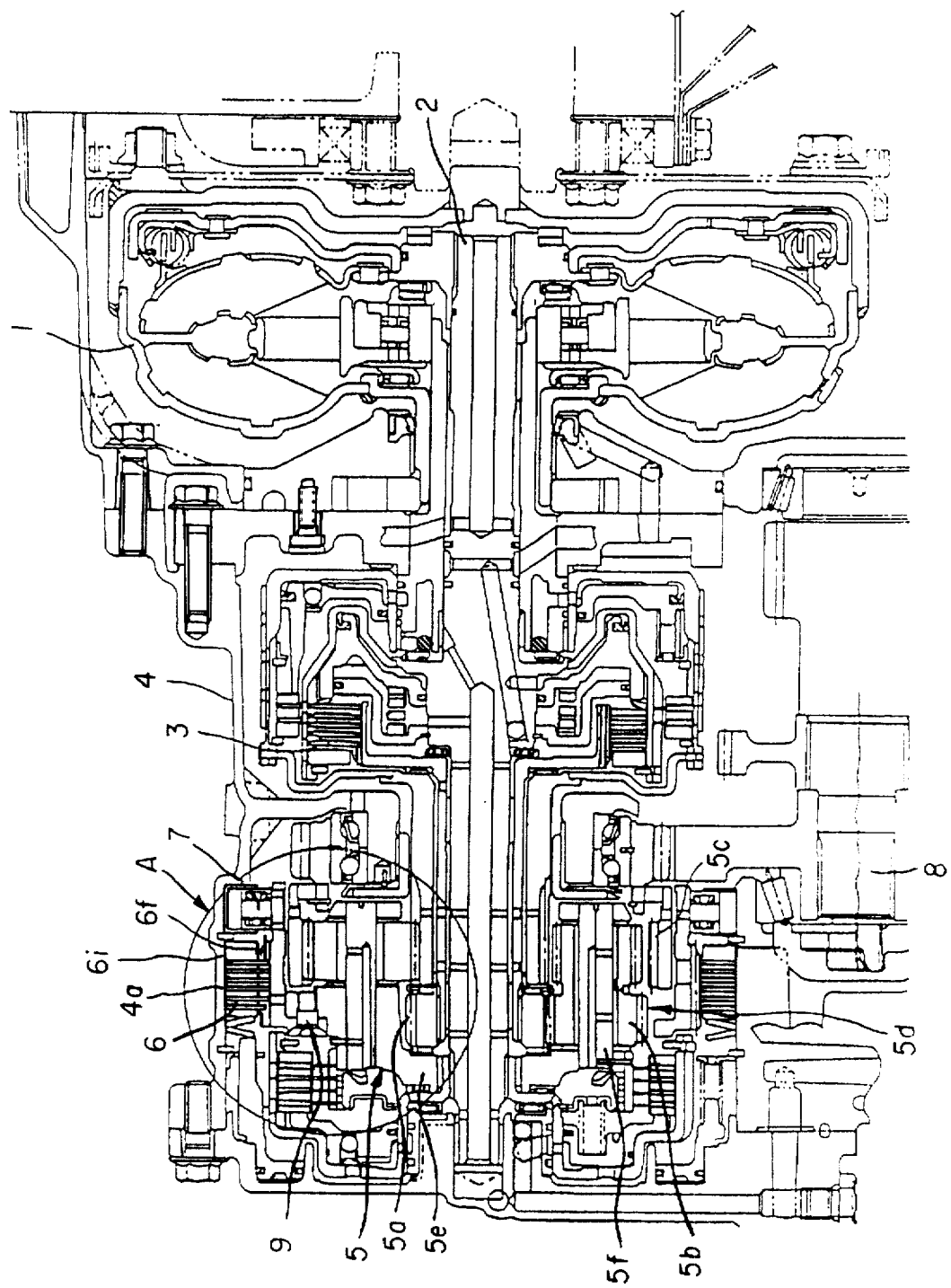
FIG. 1 is an overall sectional view of an automatic transmission comprising a carrier connecting structure according to this invention.
Figure 2:
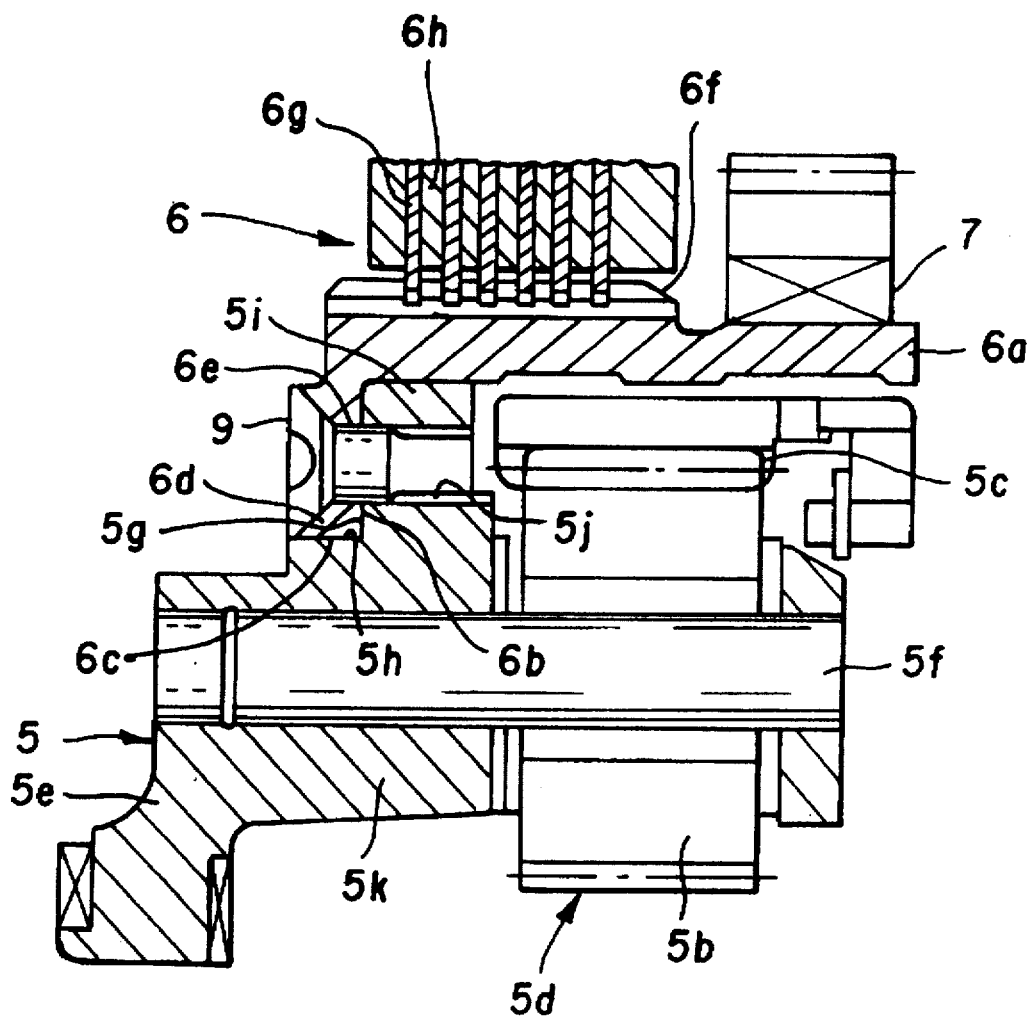
FIG. 2 is an enlarged diagram of a circle A in FIG. 1.
Figure 3:
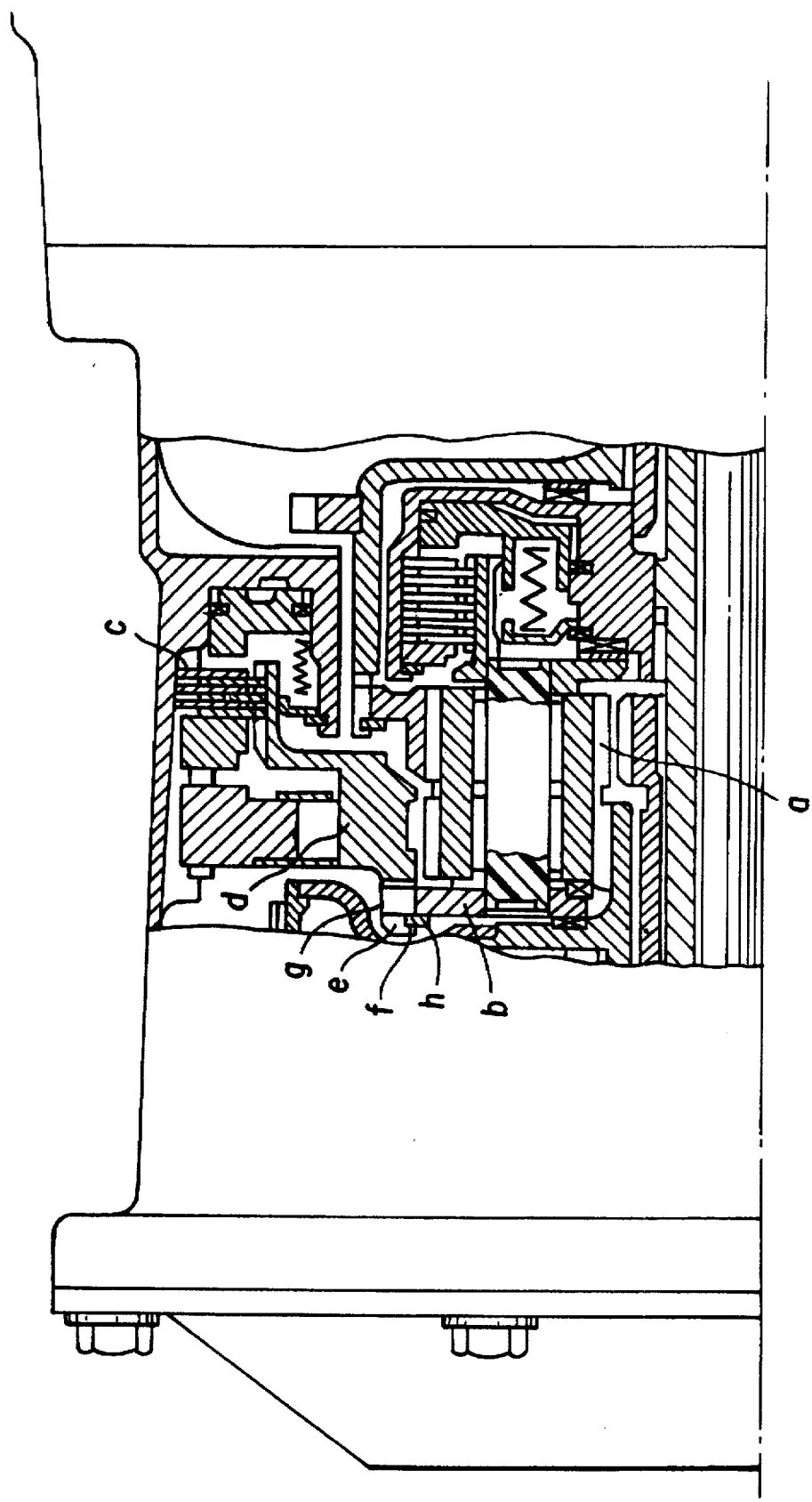
FIG. 3 is a schematic drawing showing a conventional carrier connecting structure for an automatic transmission.

FIG. 1 is an overall sectional view of an automatic transmission provided with a carrier connecting structure according to this invention. FIG. 2 is an enlarged view of a circle A in FIG. 1.

In FIG. 1, the automatic transmission includes a torque converter 1 disposed at one end of an input shaft 2, a high clutch 3 contained inside a transmission case 4, a planetary gear mechanism 5, a low and reverse brake 6, and a one way clutch 7 which is a power transmitting means permitting rotation in only one direction.

The planetary gear mechanism 5 inputs the motive power through the input shaft 2 and outputs it to an output shaft 8, the rotational speed thereof being decreased. The planetary gear mechanism 5 is constructed by a gear train 5d comprising a sun gear 5a disposed on an output shaft 3a of the high clutch 3, a planetary gear 5b which is a short pinion gear that engages with this sun gear 5a, and an internal gear 5c that engages with this planetary gear 5b. The planetary gear 5b is supported via a shaft 5f by a boss 5k of a carrier 5e which is free to rotate.

On the outer circumference of the carrier 5e, a fixing section 5i is formed having fixing surfaces 5g, 5h on two surfaces oriented in a perpendicular direction and circumferential direction relative to a center axis as shown in FIG. 2, and a rotating member 6a forming the hub of the low and reverse brake 6 is attached to this fixing section 5i.

A ring-shaped flange 6d having fixing surfaces 6b, 6c that come in close contact respectively with the fixing surfaces 5g in the perpendicular direction and 5h in the circumferential direction of the fixing section 5i projects from one end of a rotating member 6a. Positioning in the axial direction is performed by bringing the fixing surfaces 5g, 6b in the perpendicular direction in contact, and centering of the carrier 5e is performed by bringing the fixing surfaces 5h, 6c in a circumferential direction in contact.

The flange 6d of the rotating member 6a has a plurality of fixing holes 6e at equidistant intervals in the circumferential direction, and the fixing section 5i of the carrier 5e has screw holes 5j at positions which coincide with the fixing holes 6e. The carrier 5e and rotating member 6a are connected together by screwing screw members 9 which are connecting means inserted from the side of the fixing holes 6e, into the screw holes 5j.

A spline 6f is formed on the outer circumference of the rotating member 6a, and a spline 4a opposite this spline 6f is formed on the inner circumference of the transmission case 4. A plurality of disks 6g and plates 6h are interposed between the splines 6f, 4a such that the disks are superposed.

Inner circumferential parts of the disks 6g are engaged to the spline 6f on the side of the rotating member 6a, and outer circumferential parts of the plates 6h are engaged to the spline 4a on the side of the transmission case 4, the carrier 5e being braked via the rotating member 6a by pressing these disks 6g and plates 6h together by a piston 6i that functions by hydraulic pressure.

The aforesaid one-way clutch 7 which allows the rotating member 6a to rotate in only one direction is interposed between the rotating member 6a and inner circumferential surface of the transmission case 4.

Next, the assembly of the carrier 6e of the planetary gear mechanism 5 and low and reverse clutch 6 will be described. When the carrier 5e and rotating member 6a are assembled by bringing the fixing surface 5g in a perpendicular direction and the fixing surface 5h in a circumferential direction of the fixing section 5i formed on the outer circumference of the carrier 5e, in contact with the fixing surfaces 6b, 6c of the flange 6d provided on the rotating member 6a as shown in FIG. 2, the screw members 9 inserted from the fixing holes 6e of the flange 6d is screwed into the screw holes 5j of the fixing section 5i, and this screw members 9 is tightened so as to securely fix the carrier 5e and rotating member 6a.

There is therefore no need for a backlash in the axial direction of the carrier 5e and rotating member 6a, and by bringing the fixing surfaces 5h, 6c in the circumferential direction in contact with each other, the carrier 5e can be centered. Further, by preassembling the carrier 5e and rotating member 6a, the assembly of the automatic transmission is rendered easier.

As described hereintofore, in the carrier connecting structure for an automatic transmission according to this invention, a fixing section having a fixing surface in a perpendicular direction and a fixing surface in a circumferential direction is provided on the outer circumference of a carrier of a planetary gear mechanism, a flange comprising fixing surfaces that come in contact with the aforesaid fixing surfaces projects from a rotating member on a brake, and the fixing section of the aforesaid carrier and the flange of a rotating member are fixed by connecting means. The structure connecting the carrier and rotating member is therefore simpler than the conventional structure using a snap ring, and machining of the connecting part of the structure is easy. The cost of machining parts is therefore less, and as there is no need of a backlash in the axial direction, the overall length of the transmission is reduced.

By bringing the fixing surfaces in the circumferential direction of the carrier and the rotating member in contact with each other so as to fix the carrier and rotating member, the carrier is centered by the rotating member, so the gear tooth contact of the planetary gear train supported by the carrier is uniform. As a result, there is no uneven wear of the planetary gear train, the durability of the planetary gear mechanism is largely improved, and as motive power is transmitted between the carrier and rotating member via the connecting means, this power is transmitted correctly and reliability is therefore improved.

As the carrier and rotating member can be partially preassembled, they can easily be integrated in an automatic transmission, there is no risk of a snap ring falling off prior to or during assembly as in the conventional device using a snap ring, and the state of fixture of the connecting means can easily be checked.

As the fixing section which attaches the flange of the rotating member is disposed in a boss supporting a short pinion, there is no need to attach the fixing section to the carrier which would make the carrier longer in the axial direction, and conventional carriers may be used without modification.

In particular, when the invention is applied to a double row planetary gear train comprising a long pinion and a short pinion, both pinion gears are wrapped in the axial direction, and as there is a space in the axial direction for the boss supporting the shaft of the short pinion, a fixing section for attaching a rotating member can be disposed in this space so that there is no need to increase the dimensions of the assembly in the axial direction.

What is claimed is:

1. A carrier connecting structure for an automatic transmission comprising:

a brake that connects and disconnects a rotating member by oil pressure and a planetary gear mechanism comprising a carrier supporting a planetary gear train, wherein a fixing section having fixing surface oriented in a perpendicular direction and a circumferential direction relative to a shaft line is provided on the outer circumference of said carrier, a flange having a fixing surface which comes in contact with said fixing surfaces projects from said rotating member, and said fixing section of said carrier and said flange of said rotating member are connected by connecting means, and wherein said rotating member and said planetary gear train are located at the same side of said carrier.

2. A carrier connecting structure for an automatic transmission as defined in claim 1 wherein said connecting means is a screw member.

3. A carrier connecting structure for an automatic transmission as defined in claim 1 which can rotate in only one direction due to power transmitting means inserted between said rotating member and a transmission case, said power transmitting means permitting rotation in only one direction.

4. A carrier connecting structure for an automatic transmission as defined in claim 1 wherein said planetary gear mechanism comprises a double row planetary gear train.

5. A carrier connecting structure for an automatic transmission as defined in claim 4 wherein the position of said fixing section which attaches the flange of said rotating member is located in a boss supporting a pinion gear.

\* \* \* \* \*